US008682497B2

(12) United States Patent
Thomas et al.

(10) Patent No.: US 8,682,497 B2
(45) Date of Patent: Mar. 25, 2014

(54) METHOD OF DEMAND SIDE ELECTRICAL LOAD MANAGEMENT AND AN ASSOCIATED APPARATUS AND SYSTEM

(75) Inventors: Rajeev Thomas, Fourways (ZA); Andrew Peregrin Goehdart, Ifafi (ZA); Joe Paul, Lonehill (ZA)

(73) Assignees: Util Labs (Pty) Ltd., Sandton (ZA); Eskom Holdings Soc Ltd., Sandton (ZA)

( * ) Notice: Subject to any disclaimer, the term of this patent is extended or adjusted under 35 U.S.C. 154(b) by 954 days.

(21) Appl. No.: 12/742,417

(22) PCT Filed: Nov. 11, 2008

(86) PCT No.: PCT/IB2008/054715
§ 371 (c)(1),
(2), (4) Date: May 11, 2010

(87) PCT Pub. No.: WO2009/063397
PCT Pub. Date: May 22, 2009

(65) Prior Publication Data
US 2010/0274405 A1    Oct. 28, 2010

(30) Foreign Application Priority Data
Nov. 12, 2007 (ZA) .............................. 2007/09714

(51) Int. Cl.
*G01M 1/38* (2006.01)
*G05B 21/00* (2006.01)
*G05B 13/00* (2006.01)
*G05B 15/00* (2006.01)
*G05D 9/00* (2006.01)
*G05D 3/12* (2006.01)
*G05D 5/00* (2006.01)
*G05D 11/00* (2006.01)
*G01R 11/56* (2006.01)

(52) U.S. Cl.
USPC ........... 700/295; 700/276; 700/281; 700/296; 700/297; 705/412

(58) Field of Classification Search
USPC ........... 700/276, 281, 295, 296, 297; 705/412
See application file for complete search history.

(56) References Cited

U.S. PATENT DOCUMENTS 5,216,623 A    6/1993  Barrett et al.
5,638,295 A *  6/1997  Lagree et al. ................. 700/297

(Continued)

FOREIGN PATENT DOCUMENTS

EP    0981053 A1    2/2000
GB    1519174 A     7/1978

(Continued)

OTHER PUBLICATIONS

International Search Report mailed Dec. 6, 2009, for International Application No. PCT/IB2008/054715.

(Continued)

*Primary Examiner* — Ronald Hartman, Jr.
(74) *Attorney, Agent, or Firm* — Hunton & Williams LLP (57) ABSTRACT

The present disclosure discloses a method (310, 330, 350, 370) of demand side electrical load management and an associated apparatus (104) and system (100). The method (310, 330, 350, 370) includes providing (336, 318) a consumer of electricity with an indication of instantaneous electricity consumption. The method (310, 330, 350, 370) further includes determining (382) an electricity consumption threshold for the consumer, in response to a determination that load limiting is required and providing (384, 356, 338, 320, 322) the consumer with an indication of the electricity consumption threshold and an indication of a time period within which the consumer must limit his/her electricity consumption to comply with the electricity consumption threshold. The method (310, 330, 350, 370) also includes interrupting (360, 340, 342, 324) supply of electricity to the consumer in response to the electricity consumption of the consumer violating the electricity consumption threshold after the time period has elapsed.

10 Claims, 6 Drawing Sheets

(56) References Cited

U.S. PATENT DOCUMENTS

| | | | |
|---|---|---|---|
| 5,761,083 | A | 6/1998 | Brown et al. |
| 6,519,509 | B1* | 2/2003 | Nierlich et al. ............... 700/286 |
| 6,633,823 | B2* | 10/2003 | Bartone et al. ................. 702/57 |
| 6,643,567 | B2* | 11/2003 | Kolk et al. .................... 700/296 |
| 6,868,293 | B1* | 3/2005 | Schurr et al. ................... 700/22 |
| 7,130,719 | B2* | 10/2006 | Ehlers et al. ................. 700/276 |
| 7,324,876 | B2* | 1/2008 | Ying ............................ 700/295 |
| 8,095,233 | B1* | 1/2012 | Shankar et al. ............... 700/148 |
| 8,183,995 | B2* | 5/2012 | Wang et al. ................ 340/539.1 |
| 2002/0019758 | A1* | 2/2002 | Scarpelli ........................... 705/7 |
| 2002/0072868 | A1 | 6/2002 | Bartone et al. |
| 2002/0198629 | A1* | 12/2002 | Ellis .............................. 700/286 |
| 2003/0009401 | A1* | 1/2003 | Ellis ................................ 705/35 |
| 2003/0036820 | A1 | 2/2003 | Yellepeddy et al. |
| 2003/0193405 | A1* | 10/2003 | Hunt et al. ............... 340/870.02 |
| 2006/0106741 | A1* | 5/2006 | Janarthanan ................. 705/412 |
| 2006/0155423 | A1* | 7/2006 | Budike et al. ................. 700/286 |
| 2006/0190140 | A1* | 8/2006 | Soni .............................. 700/295 |
| 2008/0221737 | A1* | 9/2008 | Josephson et al. ............ 700/276 |
| 2008/0272934 | A1* | 11/2008 | Wang et al. ............. 340/870.11 |
| 2009/0240381 | A1* | 9/2009 | Lane ............................. 700/296 |

FOREIGN PATENT DOCUMENTS

| | | |
|---|---|---|
| JP | 2002345177 | 11/2002 |
| JP | 2007020289 A | 1/2007 |
| WO | WO 03/084022 | 10/2003 |
| WO | WO2007/014146 | 2/2007 |

OTHER PUBLICATIONS

Written Opinion of the International Searching Authority mailed Dec. 6, 2009, for International Application No. PCT/IB2008/05471.

* cited by examiner

METHOD OF DEMAND SIDE ELECTRICAL LOAD MANAGEMENT AND AN ASSOCIATED APPARATUS AND SYSTEM

FIELD OF DISCLOSURE

The present disclosure relates generally to electrical load management and specifically to methods, an apparatus and a system for demand side electrical load management.

BACKGROUND OF THE DISCLOSURE

The Applicant is aware that some countries are experiencing substantial economic growth and this may present a problem in power intensive sectors such as mining, infrastructure construction, manufacturing and the like. Such growth can only be sustained with adequate electricity infrastructure and supply. Inadequate electricity supply will have a negative effect on economic growth and loads may have to be controlled effectively in cases of inadequate supply. Electricity supply companies with supply deficiencies (that is where demand exceeds supply) need to manage their consumer load to ensure that electricity is used efficiently, electricity is not wasted, electricity supply is prioritised and targeted at the right consumer segment.

Accordingly, the Applicant wishes to provide a method of demand side electrical load management which will eliminate or at least alleviate some of the aforementioned drawbacks.

SUMMARY OF DISCLOSURE

Accordingly, the present disclosure provides a method of demand side electrical load management, the method including:

providing a consumer of electricity with an indication of instantaneous electricity consumption;

determining an electricity consumption threshold for the consumer, in response to a determination that load limiting is required;

providing the consumer with an indication of the electricity consumption threshold and an indication of a time period within which the consumer must limit his/her electricity consumption to comply with the electricity consumption threshold; and interrupting supply of electricity to the consumer in response to the electricity consumption of the consumer violating the electricity consumption threshold after the time period has elapsed.

References to electricity should be interpreted to include references to power, if the context so allows.

Determining that load limiting is required may include at least one selected from the group comprising determining automatically the load limiting is required based on pre-defined load limiting criteria and receiving a user input from a user indicating that load limiting is required.

The method may further include monitoring the consumption of electricity by the consumer at a site remote from where the electricity is actually being consumed.

Interrupting the supply of electricity may include interrupting the supply of electricity at a remote site.

Providing the consumer with an indication of instantaneous electricity consumption may include sending an indication message to the consumer, the indication message being indicative of the instantaneous electricity consumption of the consumer.

The method may include receiving from the consumer a reset request message via a telecommunications network and, in response thereto, re-establishing the supply of electricity to the consumer.

Providing the consumer with the indication of the electricity consumption threshold may include sending a threshold message to the consumer.

The present disclosure extends to an apparatus for demand side electrical load management, the apparatus including a communication arrangement operable to receive messages from a remote site and a display arrangement operable to display information, characterised in that:

the communication arrangement is operable to receive from a remote site an indication message indicative of an instantaneous electricity consumption, the display arrangement being operable to display visually the instantaneous electricity consumption; and the communication arrangement is further operable to receive from the remote site a threshold message including an indication of an electricity consumption threshold and an indication of a time period within which the consumer must limit his/her electricity consumption to comply with the electricity consumption threshold.

The communication arrangement may be in the form of a wireless communication arrangement and is operable to receive wireless messages. Instead, the communication arrangement may include connection means for connection to an electrical network and is operable to receive PLC (Power Line Communication) messages.

The apparatus may be operable to countdown and display a time remaining within which the consumer must limit his/her electricity consumption.

The apparatus may include an acoustic transducer operable to emit an audible alert indicative of receipt of the threshold message, a frequency of the beeps being dependent on a difference between current electricity consumption and the consumption threshold.

The apparatus may be operable, upon initialisation thereof, to send an initialisation message.

The present disclosure extends further to a remote controller for demand side electrical load management, the remote controller including:

a plurality of electrical connections respectively for supplying electricity to a plurality of remote loads;

a plurality of electrical switches respectively associated with the electrical connections;

at least one electricity measurement device for measuring electricity supplied to or consumed by each of the loads; and a communication arrangement operable to:

send an indication message to a master controller, the indication message indicative of the electricity supplied to or consumed by the loads;

receive from the master controller an interrupt message indicating electricity supply is to be interrupted to at least one of the loads; and the remote controller being operable to toggle the switch, in response to receipt of the interrupt message, thereby to interrupt supply of electricity to the at least one load.

The communication arrangement may further be operable to send the indication message to an apparatus for demand side electrical load management, for display on the apparatus of an instantaneous electricity consumption. The communication arrangement may be operable to receive a re-establishment message from the master controller, the remote controller being operable to re-engage the switch, in response to receipt of the re-establishment message, thereby to re-establish electricity supply to the loads.

The remote controller may be operable to interrupt electricity supply temporarily to a particular electrical connection and thereafter to receive an initialisation message from the apparatus confirming the electricity supply was interrupted, thereby to confirm that the particular apparatus is indeed associated with the particular electrical connection.

The present disclosure extends still further to a method of demand side electrical load management, the method including:

receiving from each of a plurality of electricity measurement devices at a remote controller a consumption message indicative of electricity consumption of at least one load supplied by the remote controller;

calculating, in response to a determination that there is insufficient supply of electricity to satisfy the consumption of the loads, an electricity consumption threshold for which there is sufficient supply; and sending to at least one of the remote controllers a threshold message indicative of the electricity consumption threshold.

Calculating the electricity consumption threshold may include calculating an independent electricity consumption threshold for each of the remote controllers.

The threshold message may include a time period within which to comply with the electricity consumption threshold.

The method may include sending an interrupt message to the remote controller, the interrupt message directing the remote controller to interrupt supply of electricity to at least one load controlled by the remote controller.

The method may include saving on a statistics database consumption statistics of the plurality of loads controlled by the remote controller.

The present disclosure extends yet further to a master controller for demand side electrical load management, the master controller including:

a communication arrangement operable to:

receive from a remote controller an indication message, the indication message indicative of the electricity supplied to or consumed by each of a plurality of loads; and send to the remote controller an interrupt message indicating electricity supply is to be interrupted to at least one of the loads.

The master controller may further be operable to determine whether or not the electricity consumed by each of the loads has been reduced to comply with an electricity consumption threshold and, in response to determining that the consumption of at least one load does not comply with the consumption threshold, to send an interrupt message to the remote controller directing the controller to interrupt supply of electricity to that load.

The master controller may include an energy balancing module which is operable to measure a total amount of electricity supplied to the remote sites and which is operable to compare the total amount of supplied electricity against the electricity supplied to each of the loads as indicated in the notification messages, thereby to determine whether or not all supplied electricity is accounted for.

The master controller may be operable to generate and store unique energy consumption histograms all of its supplied loads The present disclosure also provides a computer server for demand side electrical load management, the computer server including:

a communication arrangement for receiving a plurality of indication messages respectively from a plurality of remote controllers, the indication messages being indicative of electricity supplied to or consumed by respective loads of the respective remote controllers; and a control module operable to calculate, in response to a determination that there is insufficient supply of electricity to satisfy the consumption of each of the loads, an electricity consumption threshold for which there is sufficient supply;

the communication arrangement further being operable to send a threshold message to at least one of the remote controllers, the threshold message indicative of an electricity consumption threshold below which there is sufficient supply.

Determining that load limiting is required may include at least one selected from the group comprising determining automatically the load limiting is required based on predefined load limiting criteria or receiving a user input from a user indicating that load limiting is required.

The communication arrangement may be operable to send an interrupt message to at least one of the remote controllers in response to a determination that at least one of the loads of that remote controller is violating the electricity consumption threshold.

The control module is operable to generate and store unique energy consumption histograms all of the supplied loads.

The computer server may be operable to receive a reset request message via a telecommunications network from a consumer and, in response thereto, to generate and send a re-establishment message to direct that electricity supply be re-established to that user.

The present disclosure further provides a system for demand side electrical load management, the system including:

a plurality of apparatus as defined above at least one remote controller as defined above in communication with the apparatus;

at least one master controller as defined above, in communication with the remote controller; and at least one computer server as defined above, in communication with the master controller.

Each of the apparatus, the remote controller, and the master controller are modular and can be replaced in response to failure thereof and, in response to the failure, the replacement is operable to receive configuration messages from the remaining components of the system thereby automatically to configure the replacement.

The present disclosure extends also to a machine-readable medium embodying a set of instructions which, when executed by a machine, causes the machine to perform a method as defined above.

BRIEF DESCRIPTION OF THE DRAWINGS

The present disclosure will now be further described, by way of example, with reference to the accompanying diagrammatic drawings.

In the drawings.

DETAILED DESCRIPTION OF PREFERRED EMBODIMENTS

Figure 1:
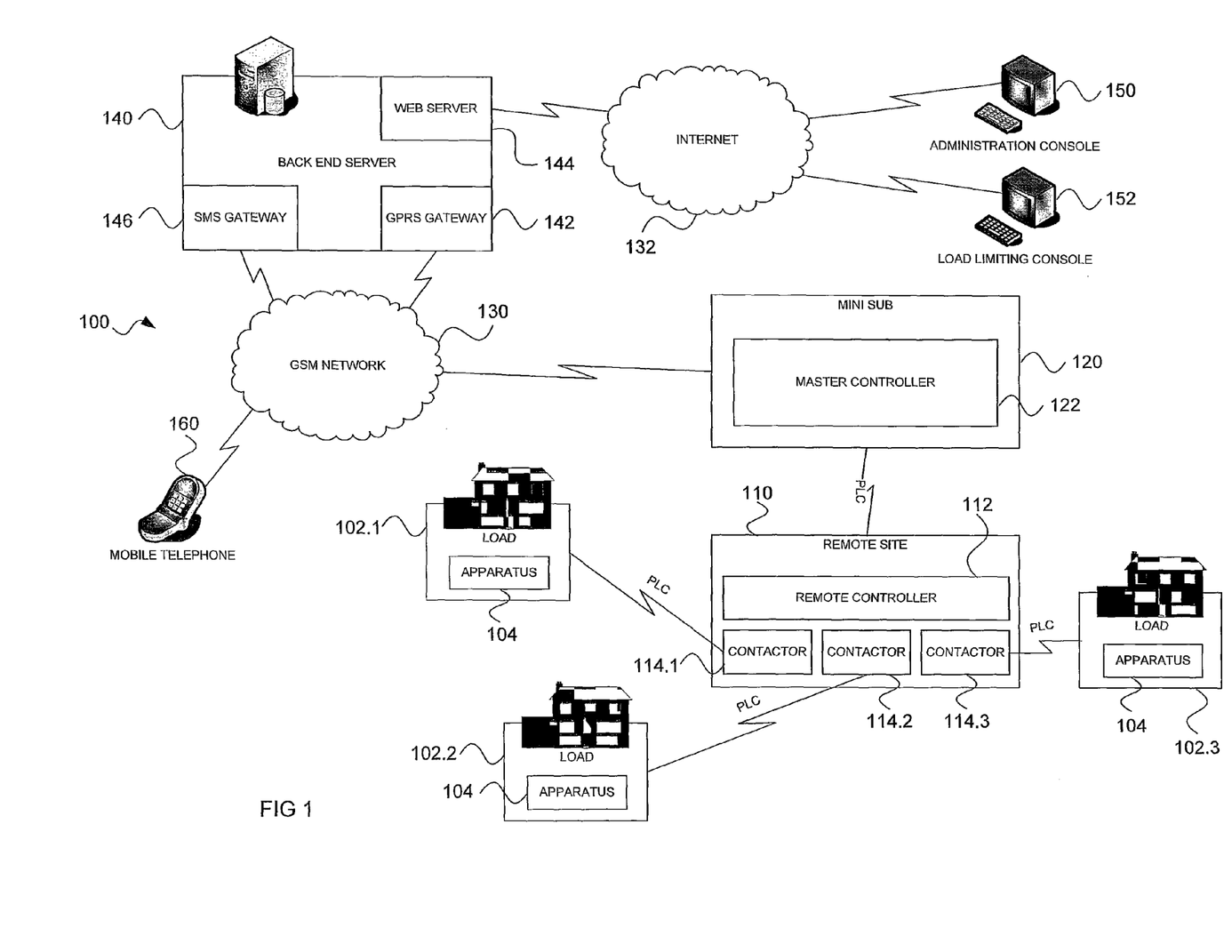
FIG. 1 shows a schematic view of a system for demand side electrical load management, in accordance with the present disclosure.

Referring to FIG. 1, reference numeral 100 generally indicates a system for demand side electrical load management, in accordance with the present disclosure.

The system 100 is used for controlling the distribution of electricity from a utility company to a plurality of end loads, which may be industrial, commercial, or residential loads. In this example, three loads 102 in the form of residential premises or houses are illustrated, but it is to be appreciated that there may be a far more loads present in the system 100. Each load includes an apparatus 104 for demand side electrical load management in accordance with the present disclosure (see further below). The system 100 is specifically configured for demand side (e.g. at the side of a consumer or resident consuming electricity at the residential premises) electrical load management. Thus, the consumer is empowered or required to regulate his/her electricity consumption.

Supply of electricity to the loads 102 is done via a remote site 110. The remote site 110 houses a remote controller 112 together with a plurality of electrical connections and for connection to the respective loads and a plurality electrical switches, in the form of contactors 114, for interrupting supply of electricity. Specifically, each load 102 has a contactor 114 associated therewith and selectively actuating a particular contactor 114 selectively allows or interrupts supply of electricity to the load 112 associated with that contactor 114. The contactor 114 may be in the form of an electromechanical latch. Further, the remote controller 112 is operable to command or actuate each of the contactors 114 independently by means of a communication protocol between the remote controller 112 and the contactors 114, for example being a serial communications protocol (e.g. RS232 protocol).

In addition, the remote controller is in communication with each of the apparatus 104 of the respective loads 102. In one example, this communication could be a wireless communication and, in such case, the remote site 110 would then include a wireless transceiver, such as an RF transmitter/receiver. However, in this example, communication between the apparatus 104 and the remote controller 112 is by means of a wired signal, specifically using PLC (Power Line Communication).

The remote site 110 also includes a plurality of electricity measurement devices to monitor the electricity consumption of each of the loads 102. The electricity consumption monitored by the respective electricity measurement devices can be communicated from the remote controller 112 to the apparatus 104 so that a consumer is able to see an instantaneous indication of electricity consumption (see further below) and, optionally, of historical energy usage.

The remote site 110 is supplied with electricity via mini substation (further referred to as a mini sub) 120 or an overhead transformer. The mini sub 120 includes a master controller 122 and is in communication with the remote controller 112 of the remote site 110 by means of, for example, PLC. The master controller 122 and the remote controller 112 are operable to send a plurality of messages to each other to facilitate demand side electrical load management.

It is to be understood that an electricity distribution network may vary from one region to another. Thus, it may not necessarily be convenient to have a separate remote site 110 and mini sub 120, but it may be more appropriate to have these two consolidated into a single unit.

The mini sub 120 is additionally in communication with a telecommunications network, for example a GSM cellular telephone network 130, or CDMA or other appropriate telecommunications protocol.

The system 100 further includes a computer server in the form of a back-end server 140. The back-end server 140 is configured to perform a plurality of administrative and record-keeping functions, in addition to load limiting functions. In this example, the back-end server 140 includes a plurality of communication arrangements for communication with various components and subsystems. More particularly, the back-end server 140 includes a GPRS gateway 142 for communication with the mini sub 120 via the GSM network 130. Thus, the back-end server 140 is in wireless communication with the mini sub 120 so that the master controller 122 can send indication messages to the back-end server 140 for load limiting, administrative and statistical purposes.

The back-end server 140 further includes a web server 144 in communication with the telecommunications network in the form of the Internet 132. Via the Internet, an administration console 150 and a load limiting console 152 are connectable to the back-end server 140 respectively for administrative functions and load limiting operations. Further, the back-end server 140 includes an SMS gateway 146 for sending/receiving messages, particularly SMS messages, to/from a communication device which in this example is in the form of a mobile telephone 160. In an alternative embodiment, the back-end server 140 may include an Interactive Voice Response (IVR) system (not illustrated) for sending or receiving messages, for example from a fixed line telephone.

The back-end server 140 includes a database for storing thereon electricity consumption statistics. These statistics may be remotely accessible by one or both of the administration console 150 and the load limiting console 152.

Figure 2:
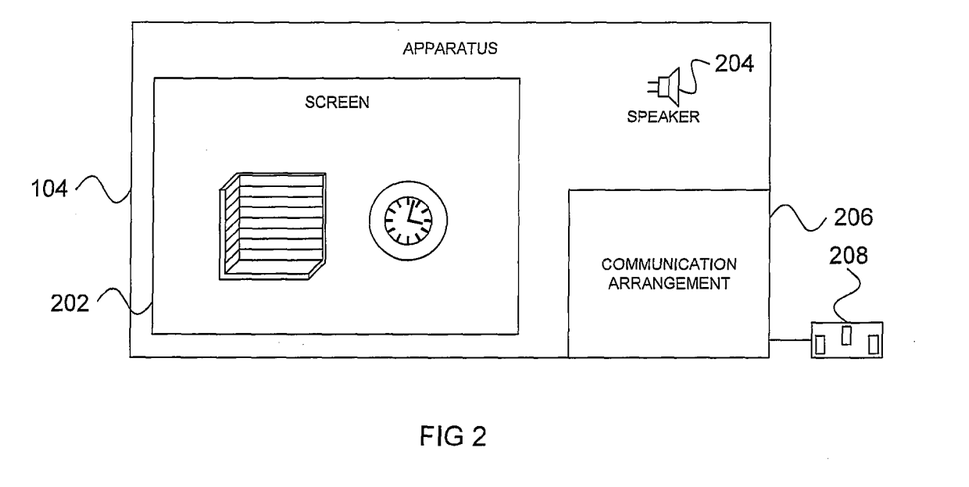
FIG. 2 shows a schematic diagram of an apparatus in accordance with the present disclosure, forming part of the system of FIG. 1.

Referring now to FIG. 2, the apparatus with a 104 is illustrated in more detail. The apparatus 104 includes a display arrangement in the form of a screen 202. The screen 202 may be an LCD screen or, in a simplified version of the apparatus 104, may simply comprise a plurality of LEDs. The screen 202 is operable to display an instantaneous electricity consumption of a premises to which the apparatus 104 is connected. The apparatus 104 includes an acoustic transducer in the form of a speaker 204 operable to emit an audio alert (see further below).

The apparatus 104 further includes a communication arrangement 206. While the communication between apparatus 104 and the remote site 110 could be wireless, in this embodiment, the communication is by means of PLC. To this end, the apparatus 104 includes an electrical connection means in the form of a domestic plug connector 208 for connection of the apparatus 104 to an electrical system of the load 102 (for example for plugging the apparatus 104 into an electrical socket of a domestic residence).

The apparatus 104 is then operable to receive, via the communication arrangement 206, a plurality of remote messages, for example emanating from the remote site 110. Importantly, the apparatus 104 is operable to receive at least one indication message or signal indicative of an instantaneous electricity consumption of the load 102 to which the apparatus 104 is connected. More particularly, the apparatus 104 is operable to receive a plurality of indication messages or a continuous indication message, thereby to receive continuously and in real-time an indication of instantaneous electricity consumption. Correspondingly, this instantaneous electricity consumption is displayed on the screen 202, for example in a graphical format. Accordingly, by looking at the screen 202, a consumer can get a visual indication of the electricity which he/she is consuming at that instant.

Also importantly, the apparatus 104 is operable to receive remotely (e.g. from the remote site 110) a threshold message including an indication of an electricity consumption threshold and an indication of a time period within which the consumer must limit his/her electricity consumption to comply with the electricity consumption threshold. This threshold message will typically be sent and correspondingly received during periods of high electricity demand and insufficient electricity supply, when consumers are to be encouraged or required to limit their electricity consumption (further referred to as load limiting). This consumption threshold is also displayed on the screen 202, optionally being superimposed against the display of instantaneous electricity consumption, so that the consumer can see at a glance whether or not his/her consumption is violating the consumption threshold or not. Also contained within the threshold message is a time limit within which the consumer is required to comply with the consumption threshold. This time limit is also displayed on the screen 202, for example in the form of a countdown timer. The apparatus 104 may sound an audible alarm via the speaker 204 in response to receipt of any threshold message. If the consumer does not comply with the consumption threshold within the given time, the supply of electricity to the load may be interrupted (see further below).

It will be appreciated that a drop (or rise) in electricity consumed by the load 102 will effect a corresponding drop or rise displayed on the screen 202. Accordingly, if a consumer turns off and electricity consuming apparatus (such as an oven or stove), he/she can visually see the result by a corresponding dip in the consumed electricity indicated by the screen 202. If desired, the screen 202 could also be configured to display historical consumption data, for example for the past 10 minutes, 1 hour, or the like, so that the consumer can see more clearly the effect of electing to turn off appliances or other electricity consuming devices.

In another example embodiment, the apparatus 104 may be configured to be operable only to receive messages. However, in this example embodiment, the apparatus 104 is configured also to be able to send messages by means of the communication arrangement 206. Optionally, the apparatus 104 may have a unique identification code or number associated therewith. Upon initialisation of the apparatus 104, it generates and sends an initialisation message upstream, e.g. to the remote site 110. Alternatively, the initialisation message may be sent only in response to receiving first a query message, for example from the remote site 110. The purpose of this initialisation message is to confirm that the apparatus 104 is indeed connected and operable and further to register the apparatus 104 with the system 100. Alternatively, the remote site 110 may be operable temporarily to interrupt electricity supply to a particular electrical connection and thereafter to poll all apparatus 104 connected to the remote site. The specific apparatus 104 which confirms, by way of an initialisation message, that its power electricity was interrupted is then associated with that particular electrical connection.

Figure 3:
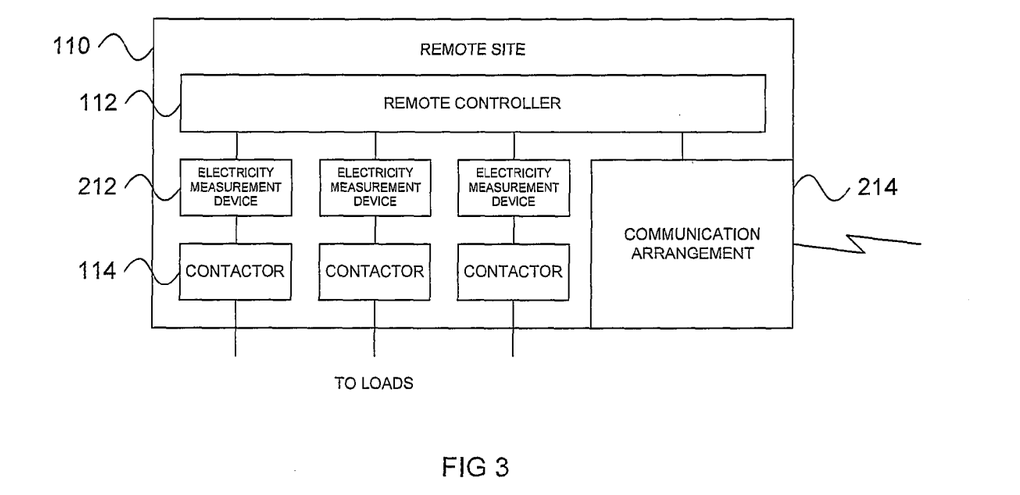
FIG. 3 shows a schematic diagram of a remote site in accordance with the present disclosure, forming part of the system of FIG. 1.

Referring now to FIG. 3, the remote site 110 is shown in further detail. Although some of the components of the remote site 110 are illustrated schematically separately, it is to be appreciated that one or more of these components may be consolidated into one another, if desired. The remote site includes a plurality of electricity measurement devices 212 respectively associated with each load 102 to monitor or measure electricity supplied to each load 102 thereby to obtain a quantitative indication of the electricity consumed by the respective loads 102. The electricity measurement device 202 may be in the form of, or may at least include, a current sensor.

For example, the remote controller 112 may include a processor and a machine-readable medium having stored there on a computer program to direct the operation of the processor. It is to be understood that the processor may be one or more microprocessors, controllers, digital signal processors (DSP), or any other suitable computing device, resource, hardware, software, or embedded logic.

The remote site 110 also includes its own communication arrangement 214. In this embodiment, the communication arrangement 214 of the remote site 110 is operable to communicate between various devices or subsystems i.e. between the downstream apparatus 104 and the upstream mini sub 120. First, the communication arrangement 214 is operable to communicate with the apparatus 104 by means of PLC. As mentioned above, the remote site 110, under the direction of the remote controller 112, is operable to send both indication messages and threshold messages to each apparatus 104 connected thereto. It will be noted that different messages are sent to respective apparatus 104, each message configured specifically for the apparatus 104 and its associated load 102.

Secondly, the communication arrangement 214 is operable also to communicate with the mini sub 120. More particularly, the remote site is operable to send indication messages (similar or identical to those sent to the apparatus 104) to the mini sub 120 and receive threshold messages from the mini sub 120. Thus, the communication with the mini sub 120 is bidirectional.

The remote site 110 is also operable to receive from the mini sub 120 an interrupt message. The interrupt message identifies a particular load 102 which has not complied with the consumption threshold and accordingly directs that the remote controller 112 interrupt supply of electricity to that load 102 by opening the associated contactor 114. Just as a plurality of loads 102 may be connected downstream of a single remote site 110, a plurality of remote sites 110 may be connected downstream of a particular mini sub 120.

Although not illustrated, the remote site 110 may also include a database having stored thereon electricity consumption information of the attached loads 102.

Figure 4:
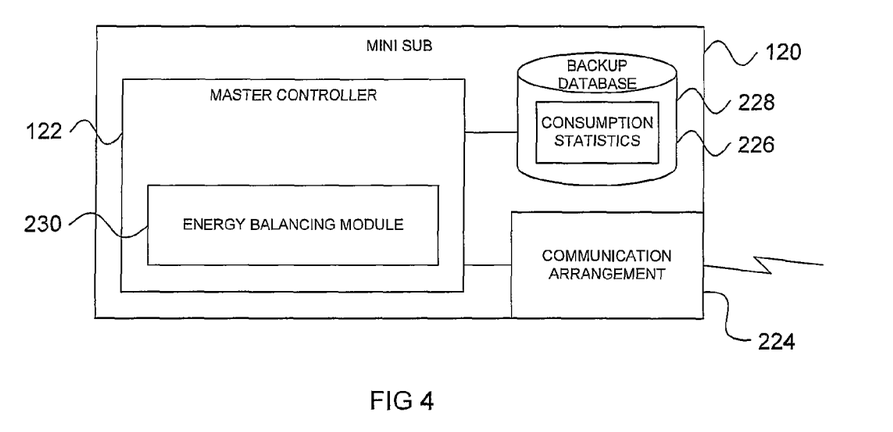
FIG. 4 shows a schematic diagram of a mini sub in accordance with the present disclosure, forming part of the system of FIG. 1.

Referring now to FIG. 4, the mini sub 120 is illustrated in more detail. The mini sub 120 includes a communication arrangement 224 which is operable to communicate in two different mediums or protocols. First, the communication arrangement 224 is operable to communicate with the remote site 110 via PLC. Secondly, the communication arrangement 224 of the mini sub 120 is operable to communicate across a telecommunications network with the back-end server 140. In this example, the communication arrangement 224 includes a wireless communication arrangement in the form of a GSM modem for communication across the GSM network 130. It is to be appreciated that in other embodiments, the communication protocols and mediums may be varied as desired. The mini sub 120 further includes a backup database 226 (for instance comprising one or more hard drives) for storing thereon consumption statistics 228. For example, the consumption messages sent from the remote sites may be stored on the database 226 as a function of location (such as the particular load 102, the geographic area, and the like) and/or as a function of time. The consumption statistics 228 may be transmitted intermittently to the back-end server 140. The intermittent transmission does not congest the communication medium, i.e. the GSM network 130, and provides the system 100 with built-in redundancy.

The master controller 122 may be operable to generate and send query messages to one or more apparatus 104 and correspondingly to receive one or more initialisation messages back, thereby to determine whether or not each apparatus 104 is functioning properly and is registered as part of the system 100.

As with the remote site 110, the master controller 120 may include a processor and a machine-readable medium having stored thereon a computer program to direct the operation of the processor.

Figure 5:
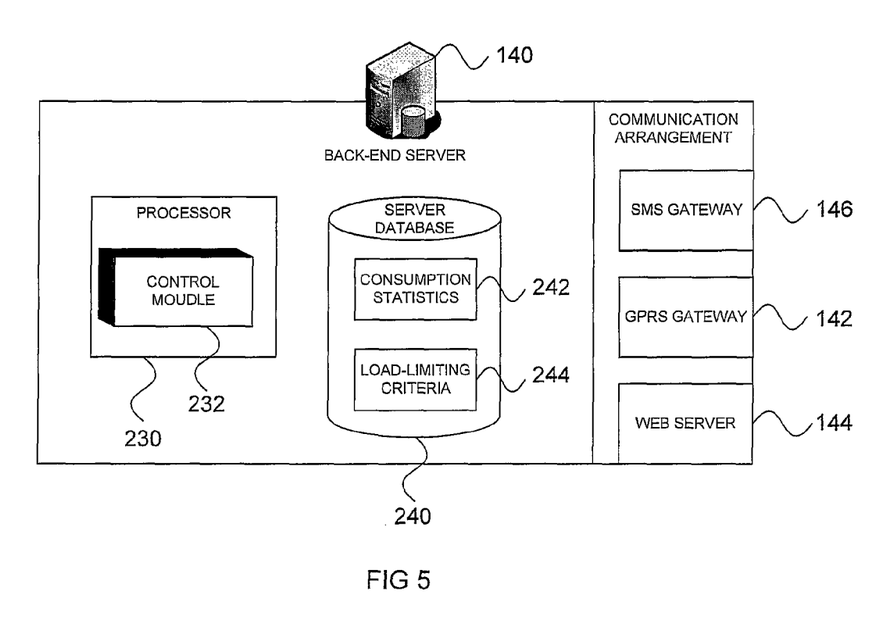
FIG. 5 shows a schematic diagram of a back-end server in accordance with the present disclosure, forming part of the system of FIG. 1.

Referring now to FIG. 5, the back-end server 140 is illustrated in more detail. The back-end server 140 includes a processor 230 which comprises a control module 232 which is a conceptual module corresponding to a functional task performed by the processor 230. Again, the back-end server may include a machine-readable medium having stored thereon a set of instructions, for example in the form of a computer program, to direct the operation of the processor 230.

In one embodiment, the control module 232 may be configured to determine automatically whether or not load limiting is required. This may be done in a number of ways and is typically based on the plurality of consumption messages sent from the mini sub 120 from the remote sites 110 indicating the consumption of each of the loads 102. In one example, the back-end server 140 may receive a supply message from an electricity supply or utilities company, indicating an available amount of electricity which can be supplied. More particularly, the supply message may be sent via the load limiting console 152 in response to a human operator determining that load limiting is required. Instead, or in addition, the back-end server 140 may include predefined load limiting criteria 244, for example saved on the database 240. The load limiting criteria 244 may include a schedule which dictates that at certain times of the day, typically during high demand times, that load limiting occurs automatically (e.g. load clipping).

Once the control module 232 has determined that load limiting is to occur, the control module 232 then determines an acceptable consumption threshold. Again, this determination may be done automatically, based on the load limiting criteria 244, or it may be based on the supply message received from the load limiting console 152.

The back-end server 140 is operable to create a histogram of consumer profiles. One way in which this histogram can be created is by placing each load or consumer in a predetermined consumption band (for example, between 0 W and 500 W and between 500 W and 1 kW, etc). If load limiting is to occur, each consumer may be required to reduce his/her electricity consumption to that of a lower consumption band. Alternatively, all loads 102 connected to a specific remote controller 104 may be assigned a common threshold (e.g. under 500 W).

The consumption threshold can then be calculated and the threshold message can be generated by the control module 232 and sent via the GPRS gateway 142 to the mini sub 120 for onward forwarding via the remote site 110 to each apparatus 104. The threshold message includes a time period (for example 5 minutes) within which time each consumer is required to comply with the consumption threshold.

In one embodiment, the control module 232 may further be operable to determine whether or not a consumer has in fact complied with the consumption threshold. However, in this embodiment, the master controller 122 is operable to determine whether or not a consumer has in fact complied with the consumption threshold by comparing the electricity consumed by each load 102 (as indicated in the indication messages) against the consumption threshold. If the consumer violates the consumption threshold, the master controller 122 is operable to generate and send an interrupt message, causing the remote controller 112 to interrupt a particular contactor 114 associated with the offending load 102.

The master controller 122 includes an energy balancing module 229 which is operable, first, to measure electricity supplied from a particular mini sub 120 to each remote site 110 and, secondly, to compare the measured amount of supplied electricity against the electricity supplied by the individual remote sites 110 to each of the loads 102 as measured by the electricity measurement devices 212, thereby to determine whether or not all supplied electricity is accounted for. If the electricity measured by the energy balancing module 229 matches the electricity supplied to each of the loads 102, all is well. However, if there is a discrepancy, it means that some electricity is being supplied which is not being accounted for. This may indicate theft of electricity. Accordingly, the energy balancing module 229 is operable to raise an alert, for example by generating and sending an alert message.

The back-end server 140 may be configured to perform a plurality of other functions. For instance, the back-end server 140 is remotely accessible, for example via the Internet 132, by a plurality of consoles or clients 150, 152. Via the administration console 150, an administrator may be able to view consumption statistics and histograms 242. Via the load limiting console 152, the administrator may be able to configure the load limiting criteria 244 or force a load shed, if necessary.

An additional feature of the back-end server 140 is that it is able to communicate with a mobile telephone 160 of the consumer. This may be useful for sending report messages between the consumer and the back-end server 140. However, in accordance with this embodiment, if electricity supplied to the consumer has been interrupted, the consumer is able to generate and send a reset request message from his mobile telephone 160 via the GSM network 130 to the back-end server 140. A reset request message indicates that a consumer is now willing or able to comply with the consumption threshold and that the supply electricity should be re-established to the consumer accordingly. In response to receipt of such a reset request message, the back-end server 140 generates and sends a re-establishment message via the mini sub 120 the remote site 110 which then re-engages the appropriate contactor 114 to re-established supply of electricity to the load 102.

Advantageously, all of the apparatus 104, the remote controllers 112 and the master controllers 122 in the system 100 are modular and replaceable. Thus, if one of these fail, it may simply be removed and a replacement added. Once the system 100 detects that a replacement has been installed or added, adjacent components automatically detect the replacement so that the system 100 may continue to function seamlessly. For example, if a particular master controller 112 fails, it may be replaced with a working replacement and adjacent components, e.g. all of the downstream remote controllers 112 and the upstream back-end server 140 may be operable to send configuration messages to the replacement, thereby to configure and integrate the replacement into the system 100.

Figure 6:
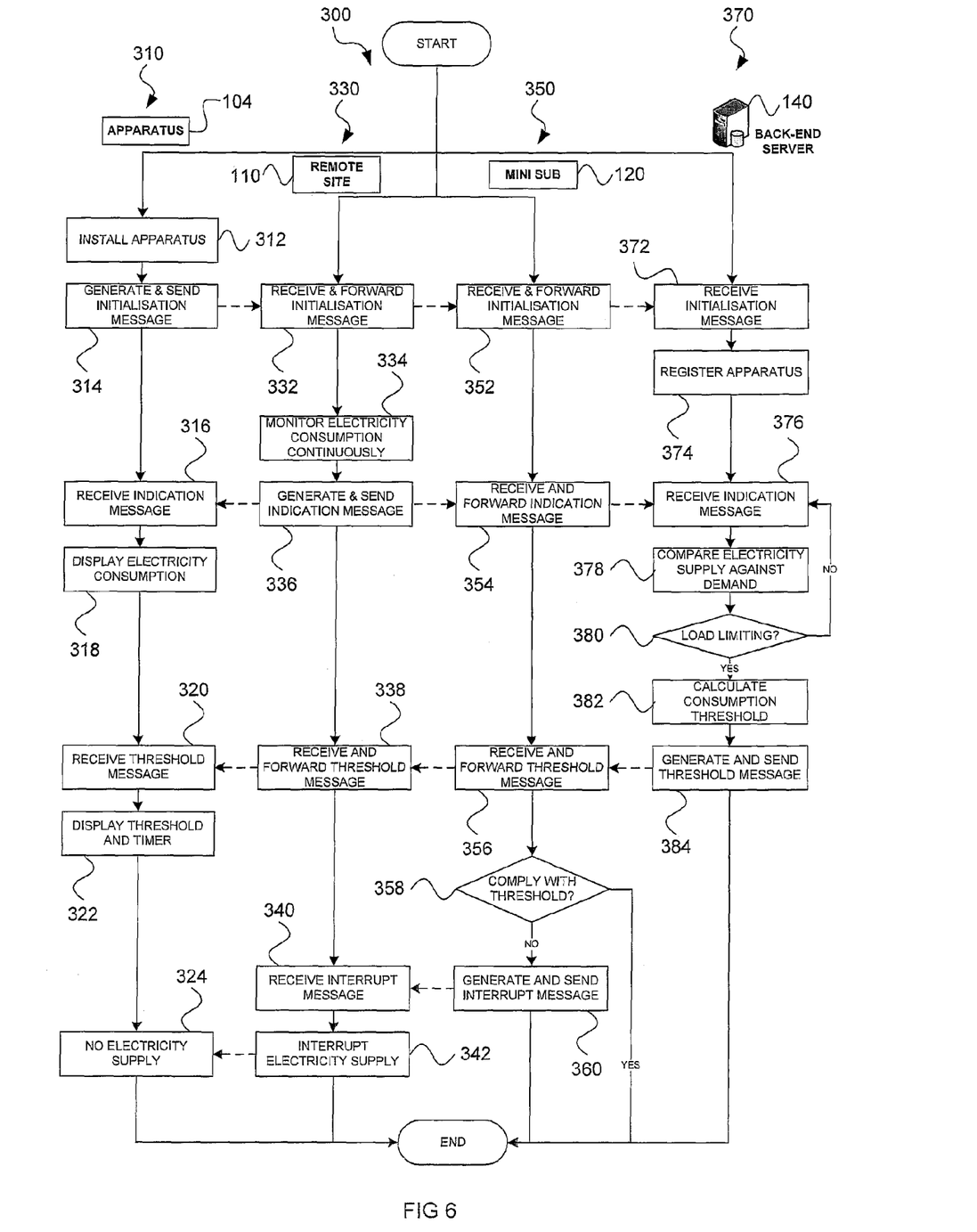
FIG. 6 shows a flow diagram of a plurality of methods in accordance with the present disclosure.

The present disclosure will now be further described with reference to a practical example and with reference to FIGS. 6 and 7. FIG. 6 illustrates a flow diagram 300 of a plurality of methods 310, 330, 350, 370 in accordance with the present disclosure. The method 310 is implemented at or by the apparatus 104, the method 330 is implemented by or at the remote site 110, the method 350 is implemented by or at the mini sub 120, and the method 370 is implemented by or at the back-end server 140. The methods 310, 330, 350, 370 are illustrated in the same figure to show their interaction, although it is to be appreciated that each method 310, 330, 350, 370 will be implemented by a separate subsystem.

Although the methods 310, 330, 350, 370 are described with reference to the system 100, it is to be appreciated that the methods 310, 330, 350, 370 may find application in a different system or that the system 100 may be configured to perform different methods.

The apparatus 104 is installed, at block 312, at a load 102 in the example form of a domestic premises. For example, a consumer may wish to manage better his consumption of electricity, or it may be a requirement of the electricity supply company that the apparatus 104 be installed. The apparatus 104 is installed in the premises simply by plugging the electrical plug 208 into an electrical socket of the premises. Upon initialisation, the apparatus 104 may generates and send, at block 314, an initialisation message upstream, via the electrical electricity line using PLC, to the connected remote site 110. The remote controller 112 may detect from which electrical connection the initialisation message was received and thereafter associate that particular apparatus 104 with that particular contactor 114 and electricity measurement device 212. Alternatively, the remote controller 112 may poll the individual electrical connections by interrupting power supply to that electrical connection temporarily. The remote controller 112 may then interrogate each apparatus 104 to determine whether or not power supply to the apparatus 104 was interrupted. The apparatus 104 responds by means of an initialisation message, thereby to determine which apparatus 104 is associated with which electrical connection. Preferably, this polling is done at times of low electricity usage, such as at midnight.

The remote site 110 receives, at block 332, the initialisation message and forwards it to the mini sub 120 which, in turn, receives, at block 352, the initialisation message and onwardly forwards it to the back-end server 140. Accordingly, the back-end server 140 receives, at block 372, the same initialisation message and in response thereto, registers, at block 374, that the apparatus is online and ready for use.

After this initial initialisation process has occurred, the remote controller 112, by means of the respective electricity measurement devices 212, continuously monitors, at block 334, the electricity consumption of each of the loads 102 associated with that particular remote site 110. Again, it is to be appreciated that there may be a plurality, even a multitude, of remote sites 110 and mini subs 120, although for ease of illustration, only one of each has been illustrated. The remote controller 112 continuously generates and sends, at block 336, indication messages which are indicative of an instantaneous electricity consumption of the consumer, both to the apparatus 104 and to the mini sub 120.

The apparatus 104 receives, at block 316, the indication message and accordingly displays, at block 318, the instantaneous consumption of electricity on the screen 202 thereof. The screen 202 thus provides a visual indication in an easy-to-read format for the consumer to monitor his electricity consumption. Simultaneously, the mini sub 120 receives, at block 354, the same or at least a similar indication message and forwards it to the back-end server 140 which correspondingly receives, at block 376, the indication message. Again, it will be noted that he may be a plurality of indication messages sent successively or, alternatively, a single continuous indication message may be sent. Alternatively, the mini sub 120 may only forward indication messages to the back-end server 140 intermittently and not in real time, thereby to avoid network congestion.

With the indication messages received from every remote controller 112 forming part of the system 100, the back-end server 140 is able to generate and store the consumption statistics 240 (in the form of a usage histogram). With these consumption statistics, the back-end server 140 is then operable to compare, at block 378, consumed electricity (i.e. demand) against available electricity supply. The control module 232 is configured to perform this comparison. This may be done, for example, by comparing the consumption statistics 242 against predefined load limiting criteria 244 to determine, at block 380, whether or not load limiting should occur. Alternatively, the back-end server 140 may be operable to receive a load limiting command from the load limiting console 152, for example if a system administrator determines that load limiting is needed.

If no load limiting is required, the method 370 may continue from block 376. On the other hand, if load limiting is required, the back-end server 140 under the direction of the control module 232, calculates, at block 382, an appropriate consumption threshold. This may be done using any appropriate algorithm. (For example, if the demand of electricity exceeds the supply by 10%, the control module 232 may determine that the consumption threshold should be 10% less for each consumer than the amount of electricity which the consumer is currently consuming.) However, in this embodiment, the consumers have been classified into consumption bands, and all the consumers associated with a particular remote site 110 are required to conform to a common consumption band, for example 0 W to 500 W. For a consumer or load 102 already consuming electricity in this band, the consumption threshold will have no relevance. However, if the load 102.1 had previously been consuming electricity in a consumption band between 500 W and 1 kW, then the consumer will need to lower his/her consumption.

Regardless of the exact manner in which the consumption threshold is calculated, the back-end server 140 generates and sends, at block 384, a threshold message addressed to each apparatus 104, indicative of the consumption threshold assigned to the load 102 associated with that apparatus 104 and indicative of a time period, for example five minutes, which the consumer has in which to comply with the consumption threshold. Accordingly, the mini sub 120 receives and forwards, at block 356, the threshold message and so too does the remote site 110 receive and forward, at block 338, the threshold message. The apparatus 104 receives, at block 320, the threshold message.

Upon receipt of the threshold message, the apparatus 104 displays, at block 322, the consumption threshold together with an indication of the time period, for example in the form of a countdown timer. As an added indication, the apparatus 104 sounds an audible alert, for example in the form of an alarm, from the speaker 204 to attract the attention of the consumer.

Now, the consumer has an indication of his current electricity consumption (for example 750 W) and an indication of their consumption threshold (of 500 W). In order to avoid violation of the consumption threshold, the consumer should reduce his electricity consumption to below 500 W, for example by deactivating appliances such as a geyser (water heater) and/or stove.

Compliance with the consumption threshold is monitored, at block 358, by the master controller 122. This compliance may be continuously monitored, to ensure that the consumer continues to comply with the consumption threshold even after the time period has elapsed while load limiting persists. If the consumer does indeed comply with the consumption threshold, his electricity need not be interrupted and the method may repeat from block 376.

On the other hand, if the consumer violates the consumption threshold after the time period has elapsed, the master controller 122 generates and sends, at block 360, an interrupt message. Accordingly, the remote site receives, at block 340, the interrupt message which includes an indication of the specific load 102 violating the consumption threshold. The remote controller 112 then opens or actuates the contactor 114 associated with that load 102 to interrupt, at block 342, the supply of electricity to the load 102. For example, the consumer at load 102.1 continued for over five minutes to consume 750 W and the contactor 114.1 is accordingly opened and the consumer is not supplied, at block 324, with any further electricity. The apparatus 104 may include a backup battery, if desired, so that it can continue to operate even when the electricity supply has been interrupted or suspended.

In another embodiment of the present disclosure, the system 100 may provide for an additional time period (e.g. another five minutes) after the interruption of supply of electricity within which the consumer can turn off appliances and supply of his electricity will be re-established if his consumption does not violate the consumption threshold.

Figure 7:
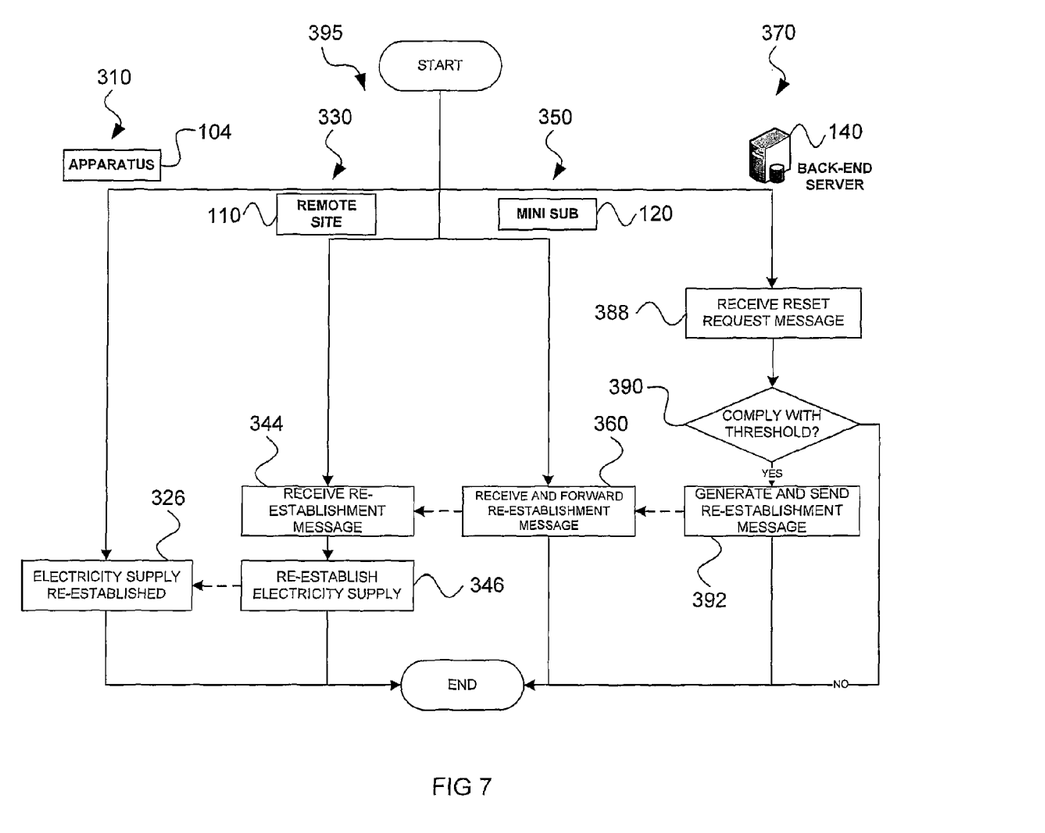
FIG. 7 shows a flow diagram of methods following those of FIG. 6.

In this embodiment, the re-establishment of electricity supply procedure is illustrated in FIG. 7 which shows a flow diagram of a method 395. In a prior step (not illustrated) the consumer has associated his mobile telephone 160 with the back-end server 140, such that the back-end server 140 is configured to recognise a telephone number associated with the mobile telephone 160 and then to match that telephone number to a specific load (e.g. the load 102.1).

If a consumer was away from his house (e.g. load 102.1) and a load limiting period occurred, the supply of electricity to the house may have been interrupted in the consumer's absence. Upon returning, the consumer observes that his electricity has been interrupted or cut off. He then sends a reset request message, in the example form of an SMS message, to a predefined telephone number associated with the back-end server 140. The message need not necessarily contain any information, but could be a blank SMS message. The back-end server 140 receives, at block 388, the reset request message. It is determined, at block 390, whether or not the load 102.1 does now comply with the consumption threshold and if so, a re-establishment message is generated and sent, at block 392.

Accordingly, the mini sub 120 receives, at block 360, the re-establishment message and forwards it on to the remote site 110. upon receipt, at block 344, by the remote site 110 of the re-establishment message, the remote controller 112 re-engages the contactor 114.1 thereby to re-establish, at block 346, electricity supply to the load 102.1. Accordingly, the consumer has now re-established, at block 326, supply of electricity to his house.

When load limiting is no longer required, a cancellation message may be sent or the threshold message may simply no longer be sent, and the consumer may once again use as much electricity as desired.

Optionally, the system 100 may assign a lower threshold (e.g. 400 W), below which load limiting will never occur. Thus, if the consumer leaves his/her house and ensures that electricity consumption in his/her absence is below 400 W, the consumption threshold will never be below the lower threshold of 400 W and the consumer's electricity supply will therefore not be interrupted in his/her absence.

Figure 8:
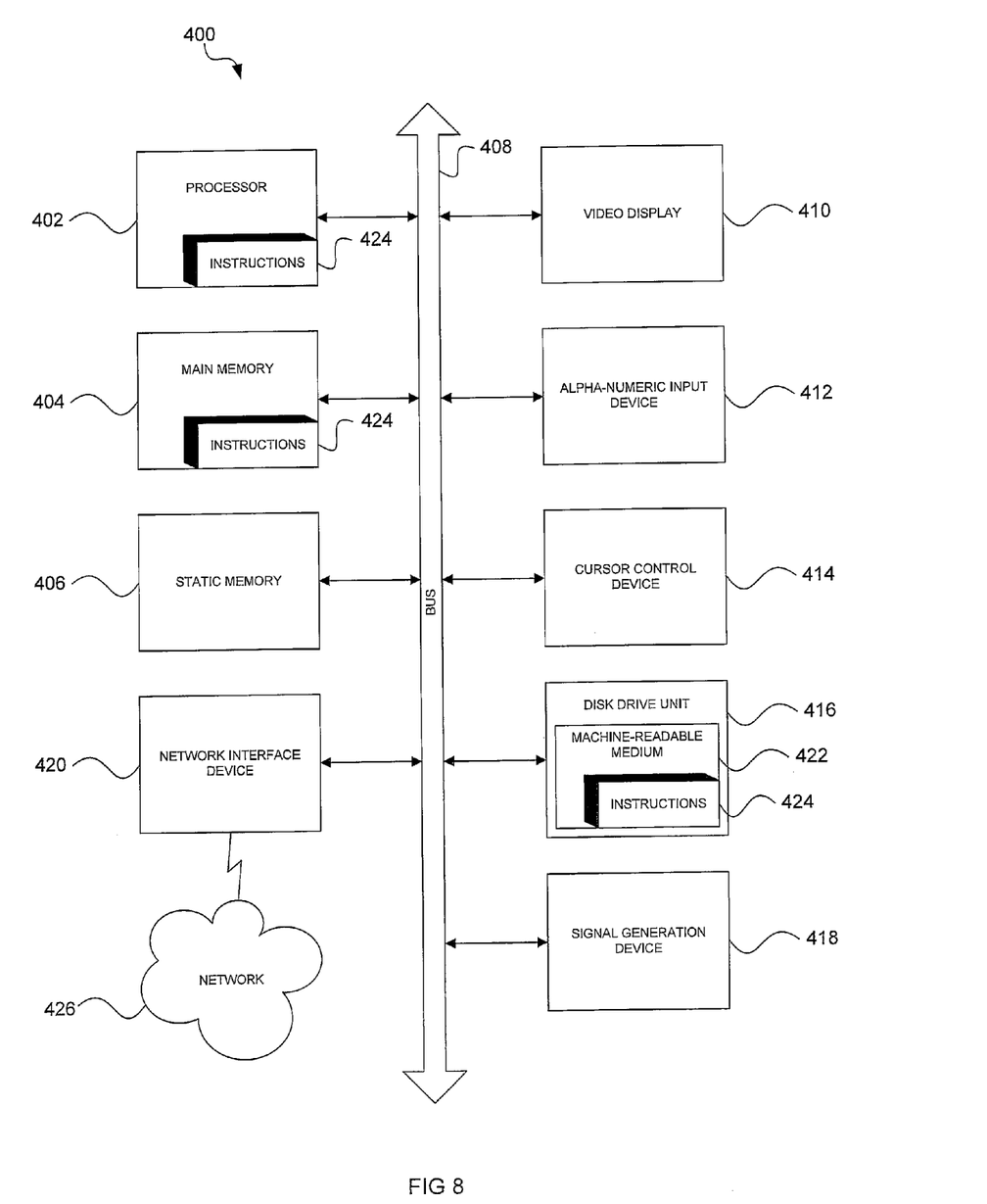
FIG. 8 shows a schematic representation of a machine in the example form of a computer system within which a set of instructions, for causing the machine to perform any one or more of the methodologies discussed herein, may be executed.

FIG. 8 shows a diagrammatic representation of a machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU), a digital signal processor (DSP), any combination of these processors, a main memory 404 and a static memory 406, which communicate with each other via a bus 408. The computer system 400 may further include a video display unit 410 (e.g., a liquid crystal display (LCD), a plasma display, or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g. a speaker) and a network interface device 420.

The disk drive unit 416 includes a machine-readable medium 422 on which is stored one or more sets of instructions and data structures (e.g., software 424) embodying or utilised by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP or FTP).

While the machine-readable medium 422 is shown in an example embodiment to be a single medium, the term "machine-readable medium" should be taken to include a single medium or multiple media (e.g., a centralised or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present embodiments, or that is capable of storing, encoding or carrying data structures utilized by or associated with such a set of instructions. The term "machine-readable medium"

shall accordingly be taken to include, but not be limited to, solid-state memories, optical and magnetic media, and carrier wave signals.

The apparatus 104, the remote controller 112, the master controller 122, and/or the back-end server 140 may be in the form of the computer system 400.

The Applicant believes that the present disclosure as exemplified has a number of advantages. It gives the end consumer (whether residential, commercial or industrial) a measure of control over which appliances are powered, and which are not, during periods of load limiting. It also encourages the consumer to use electricity responsibly. A consumer can avoid altogether any interruption of supply of electricity to his/her premises by timeously complying with the consumption threshold.

Electricity consumption statistics may be gathered and saved for later review of consumption patterns and for determining load limiting criteria 244. The system 100 includes built-in redundancy in that the master controller 122 may be configured to perform some or all of the functions of the back-end server 140 in response to failure of the back-end server 140. Further, consumption statistics may be stored locally at the mini sub 120 and periodically synchronised with those of the back-end server 140.

Also electricity supplied can be compared with electricity consumed as measured by the electricity measurement devices 212, thereby to ensure that no electricity is being lost or stolen.

The invention claimed is:

1. An apparatus for demand side electrical load management, the apparatus including a communication arrangement operable to receive messages from a remote site and a display arrangement operable to display information, characterised in that:
    the communication arrangement is operable to receive from a remote site an indication message indicative of an instantaneous electricity consumption, the display arrangement being operable to display visually the instantaneous electricity consumption;
    the communication arrangement is further operable to receive from the remote site a threshold message including an indication of an electricity consumption threshold and an indication of a time period within which the consumer must limit his or her electricity consumption to comply with the electricity consumption threshold;
    the display arrangement is operable to display a time remaining within which the consumer must limit his/her electricity consumption, and
    the apparatus further including an acoustic transducer operable to emit an audible beeping alert indicative of receipt of the threshold message, a frequency of the beeping alert being dependent on a difference between current electricity consumption and the consumption threshold.

2. An apparatus as claimed in claim 1, in which the communication arrangement is in the form of a wireless communication arrangement and is operable to receive wireless messages.

3. An apparatus as claimed in claim 1, in which the communication arrangement includes connection means for connection to an electrical network and is operable to receive PLC (Power Line Communication) messages.

4. An apparatus as claimed in claim 1, which is operable, upon initialisation thereof, to send an initialisation message to the remote site.

5. A remote controller for demand side electrical load management, the remote controller including:
    a plurality of electrical connections respectively for supplying electricity to a plurality of remote loads;
    a plurality of electrical switches respectively associated with the electrical connections;
    at least one electricity measurement device for measuring electricity supplied to or consumed by each of the loads; and
    a communication arrangement operable to:
        send an indication message both to a master controller, the indication message indicative of the electricity supplied to or consumed by the loads, and to a remote apparatus for demand side electrical load management, for display on the apparatus of an instantaneous electricity consumption; and
        receive from the master controller an interrupt message indicating electricity supply is to be interrupted to at least one of the loads;
    the remote controller being operable to toggle the switch, in response to receipt of the interrupt message, thereby remotely to interrupt supply of electricity to the at least one load, and
    the remote controller further being operable to interrupt electricity supply temporarily to a particular electrical connection and thereafter to receive an initialisation message from the remote apparatus confirming the electricity supply was interrupted, thereby to confirm that the remote apparatus is indeed associated with the particular electrical connection.

6. A remote controller as claimed in claim 5, in which the communication arrangement is operable to receive a re-establishment message from the master controller, the remote controller being operable to re-engage the switch, in response to receipt of the re-establishment message, thereby to re-establish electricity supply to the or each load.

7. A master controller for demand side electrical load management, the master controller including:
    a communication arrangement operable to:
        receive from a remote controller at a remote site an indication message, the indication message indicative of the electricity supplied to or consumed by each of a plurality of loads, which, in turn, is remote from the remote controller;
        send to the remote controller an interrupt message indicating electricity supply is to be interrupted to at least one of the loads; and
    an energy balancing module which is operable to measure a total amount of electricity supplied to the remote sites and which is operable to compare the total amount of actual supplied electricity against the reported electricity supplied to each of the loads as indicated in the indication messages, thereby to determine whether or not all supplied electricity is accounted for.

8. A master controller as claimed in claim 7, which is further operable to determine whether or not the electricity consumed by each of the loads has been reduced to comply with an electricity consumption threshold and, in response to determining that the consumption of at least one load does not comply with the consumption threshold, to send an interrupt message to the remote controller directing the controller to interrupt supply of electricity to that load.

9. A system for demand side electrical load management, the system including:
    a plurality of apparatus for demand side electrical load management, the apparatus including a communication arrangement operable to receive messages from a remote site and a display arrangement operable to display information, characterised in that:

the communication arrangement is operable to receive from a remote site an indication message indicative of an instantaneous electricity consumption, the display arrangement being operable to display visually the instantaneous electricity consumption;

the communication arrangement is further operable to receive from the remote site a threshold message including an indication of an electricity consumption threshold and an indication of a time period within which the consumer must limit his/her electricity consumption to comply with the electricity consumption threshold; and the display arrangement is operable to display a time remaining within which the consumer must limit his/her electricity consumption;

at least one remote controller for demand side electrical load management, in communication with the apparatus, the remote controller including:

a plurality of electrical connections respectively for supplying electricity to a plurality of remote loads;

a plurality of electrical switches respectively associated with the electrical connections;

at least one electricity measurement device for measuring electricity supplied to or consumed by each of the loads; and a communication arrangement operable to:

send an indication message both to a master controller, the indication message indicative of the electricity supplied to or consumed by the loads, and to a remote apparatus for demand side electrical load management, for display on the apparatus of an instantaneous electricity consumption; and receive from the master controller an interrupt message indicating electricity supply is to be interrupted to at least one of the loads;

the remote controller being operable to toggle the switch, in response to receipt of the interrupt message, thereby remotely to interrupt supply of electricity to the at least one load;

at least one master controller for demand side electrical load management, in communication with the remote controller, the master controller including:

a communication arrangement operable to:

receive from a remote controller at a remote site an indication message, the indication message indicative of the electricity supplied to or consumed by each of a plurality of loads, which, in turn, is remote from the remote controller; and send to the remote controller an interrupt message indicating electricity supply is to be interrupted to at least one of the loads; and at least one computer server for demand side electrical load management, in communication with the master controller, the computer server including:

a communication arrangement for receiving a plurality of indication messages respectively from a plurality of remote controllers, the indication messages being indicative of electricity supplied to or consumed by respective loads of the respective remote controllers; and a control module operable to calculate, in response to a determination that there is insufficient supply of electricity to satisfy the consumption of each of the loads, an electricity consumption threshold for which there is sufficient supply;

the communication arrangement further being operable to send a threshold message to at least one of the remote controllers, the threshold message indicative of an electricity consumption threshold below which there is sufficient supply and thereafter to send an interrupt message to at least one of the remote controllers in response to a determination that at least one of the loads of that remote controller is violating the electricity consumption threshold.

10. A system as claimed in claim 9, in which each of the apparatus, the remote controller, and the master controller are modular and can be replaced in response to failure thereof and, in response to the failure, the replacement is operable to receive configuration messages from the remaining components of the system thereby automatically to configure the replacement.

* * * * *